US009696707B2

(12) United States Patent
Wang et al.

(10) Patent No.: US 9,696,707 B2
(45) Date of Patent: Jul. 4, 2017

(54) METHOD OF CONTROLLING TOOL ORIENTATION AND STEP-OVER DISTANCE IN FACE MILLING OF CURVILINEAR SURFACES

(71) Applicant: Makino Inc., Mason, OH (US)

(72) Inventors: Zhigang Wang, Mason, OH (US); Shogo Nakashima, Mason, OH (US); Mark W. Larson, Hamilton, OH (US)

(73) Assignee: Makino Inc., Mason, OH (US)

( * ) Notice: Subject to any disclaimer, the term of this patent is extended or adjusted under 35 U.S.C. 154(b) by 690 days.

(21) Appl. No.: 14/202,378

(22) Filed: Mar. 10, 2014

(65) Prior Publication Data

US 2014/0277686 A1  Sep. 18, 2014

Related U.S. Application Data

(60) Provisional application No. 61/786,925, filed on Mar. 15, 2013.

(51) Int. Cl.

| G05B 19/18 | (2006.01) |
| G05B 19/19 | (2006.01) |
| G05B 19/401 | (2006.01) |
| B23C 5/06 | (2006.01) |
| G05B 19/4093 | (2006.01) |
| B23C 5/00 | (2006.01) |
| G05B 19/04 | (2006.01) |
| B23C 3/16 | (2006.01) |

(52) U.S. Cl.
CPC ............. *G05B 19/18* (2013.01); *B23C 5/00* (2013.01); *B23C 5/06* (2013.01); *G05B 19/182* (2013.01); *G05B 19/19* (2013.01); *G05B 19/401* (2013.01); *G05B 19/4093* (2013.01); *B23C 3/16* (2013.01); *G05B 19/04* (2013.01); *G05B 2219/45145* (2013.01); *Y02P 90/265* (2015.11)

(58) Field of Classification Search
None
See application file for complete search history.

(56) References Cited

PUBLICATIONS

Chen et al., "Effects of inclination angles on geometrical features of machined surface in five-axis milling", Jun. 30, 2012, The International Journal of Advanced Manufacturing Technology, pp. 1721-1733.*

(Continued)

*Primary Examiner* — Qing Wu
(74) *Attorney, Agent, or Firm* — Frost Brown Todd LLC

(57) ABSTRACT

A method for performing a milling operation includes providing a milling cutter and a workpiece having an non-machined workpiece surface; receiving a set of milling cutter geometry parameters; creating a curvilinear profile from the workpiece surface; extracting a radius parameter from the curvilinear profile; determining an initial step-over value in response to the set of milling cutter geometry parameters; determining a surface roughness value in response to the set of milling cutter geometry parameters, the curvilinear profile of the workpiece surface, the radius parameter, and an initial tool inclination angle; determining a minimum surface roughness value in response to the cutter inclination angle value; and adjusting a calculated step-over value in response to the minimum surface roughness value where the calculated step-over value and the calculated inclination angle value are applied to operating the milling cutter.

30 Claims, 13 Drawing Sheets

(56) References Cited

PUBLICATIONS

Ko et al., "Selection of the Machining Inclination Angle in High-Speed Ball End Milling", 2001, The International Journal of Advanced Manufacturing Technology, pp. 163-170.*

Baek et al., "A dynamic surface roughness model for face milling", 1997, Precision Engineering, pp. 171-178.*

* cited by examiner

METHOD OF CONTROLLING TOOL ORIENTATION AND STEP-OVER DISTANCE IN FACE MILLING OF CURVILINEAR SURFACES

This application claims priority to U.S. Patent Application Ser. No. 61/786,925 entitled "Method of Controlling Tool Orientation and Step-Over Distance in Face Milling of Curvilinear Surfaces" filed on Mar. 15, 2013, the entire disclosure of such parent application being expressly incorporated herein by reference.

BACKGROUND

CNC machine tools are able to accurately machine and produce parts. Recently, 4/5-axis machining is increasingly used for complex shapes, such as dies, molds, turbine blades, marine propellers, aerospace parts, etc. The additional degrees of freedom of the tool movement that it provides compared to three-axis machining offers many possibilities and advantages such as increased stability, better accessibility, reasonable tool employment and less required part-setups. Furthermore, the implementation of dynamic adaptation/optimization of the orientation of a milling cutter can also provide lower scallop height, larger possible step-over distance/value ("step-over"), and better surface quality.

In some instances, it may be desirable to maximize the step-over distance of a milling cutter in order to reduce machining time and thereby maximize productivity. It may also be desirable to minimize surface roughness of a machined product. These factors may be at odds with each other. Using conventional techniques, high step-over distances (providing high productivity) may yield unacceptably rough machined surfaces; while smooth machined surfaces may require low step-over distances (resulting in unacceptably low productivity). Thus, there is a trade-off between the step-over distance and the surface roughness, and it may be difficult to strike an optimal balance between these two apparently conflicting parameters.

While a variety of methods of controlling milling cutter orientation and step-over have been used, it is believed that no one prior to the inventors has made or used an invention as described herein.

BRIEF DESCRIPTION OF THE DRAWINGS

It is believed the present invention will be better understood from the following description of certain examples taken in conjunction with the accompanying drawings, in which like reference numerals identify the same elements and in which.

Figure 1:
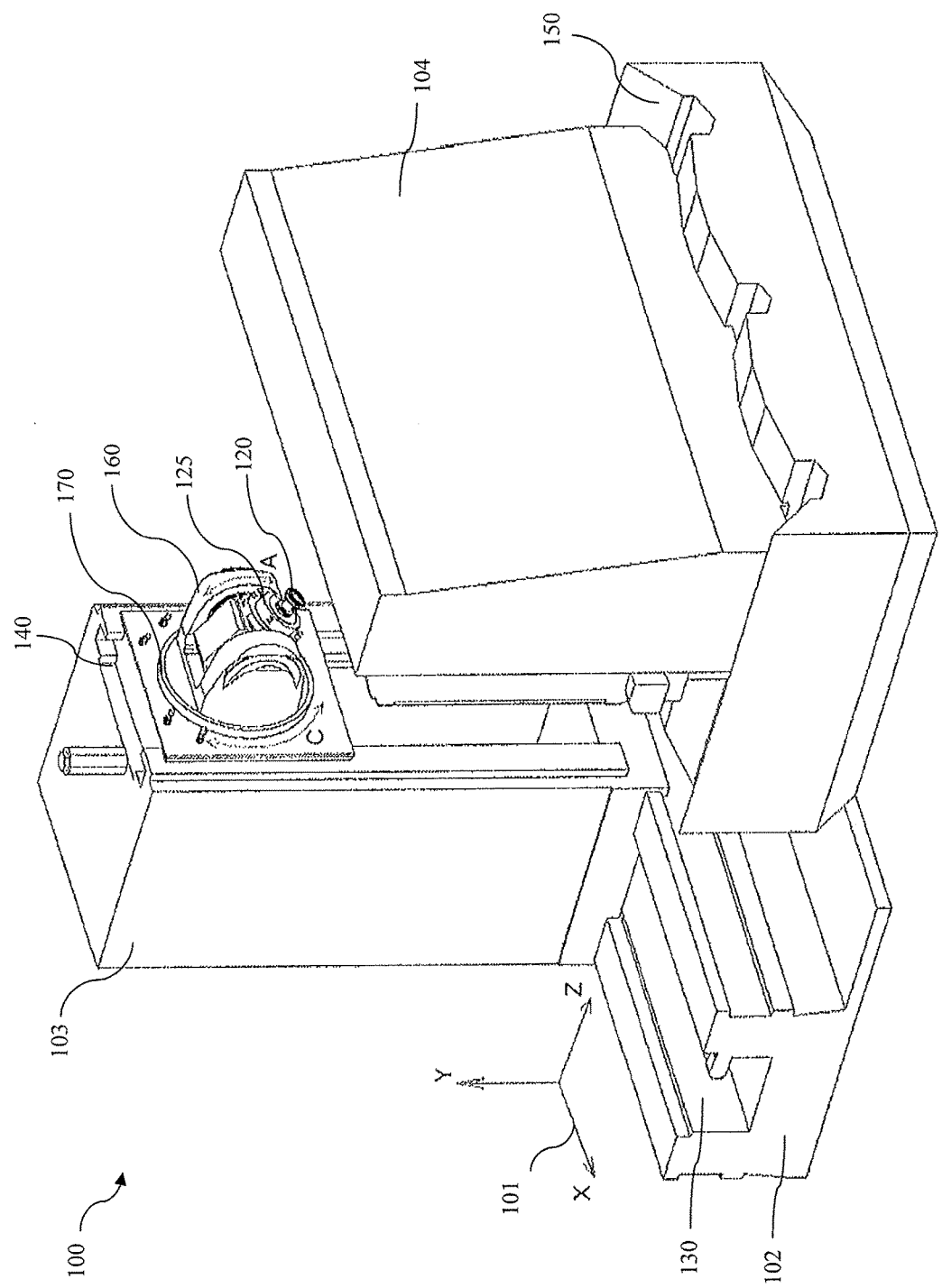
FIG. 1 depicts a perspective view of a typical axis configuration of a conventional five-axis CNC machine tool.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

FIG. 1 depicts a typical five-axis CNC machine tool 100 and its corresponding axis configuration 101. CNC machine tool 100 is shown with a base 102, a column 103 and a workpiece mount 104.

As shown in FIG. 1, the CNC machine tool 100 is operable to position a milling cutter or mill along the x and y orthogonal axes. Though the arrangement can vary, an x-axis slide 130 is arranged along the base 102, a y-axis slide 140 is arranged along the column 103. For the embodiment shown, a workpiece can be positioned along the z orthogonal axis and the workpiece mount 104 is arranged along a z-axis slide 150. Translational movement in each direction is provided by movement of the base 102, column 103 and workpiece mount 104 in the directional slides 130, 140, 150.

The machine tool 100 of this embodiment is operable to orient the milling cutter 120 along A and C rotational axes. Machine tool 100 further includes actuators to provide a rotational motion of the cutter 120 about the longitudinal axis of the cutter 120. Motion in the A direction is provided in FIG. 1 by a A-axis actuator 160. Motion in the C direction is provided in FIG. 1 by a C-axis actuator 170.

Advancement of the milling cutter 120 and/or the workpiece (not shown) can be accomplished along the axes of motion, sequentially or simultaneously. The control of a CNC machine tool 100 comes from a programmed code determining the positioning and advancement of the cutter in relation to the workpiece based upon a workpiece profile before machining and a machined profile after machining. Multiple axis milling allows a range of positions for the cutter 120 in relation to the workpiece without remounting the milling cutter 120 or the workpiece and provides a range of positions capable of accomplishing complex surfaces.

It should also be understood that the CNC machine tool 100 is operable to spin the milling cutter 120 about the longitudinal axis of the cutter 120. In addition or in the alternative, a blank workpiece or other kind of workpiece may spin and/or otherwise move while the blank/workpiece is being engaged by the milling cutter 120. In some instances, the blank/workpiece spins (and may also orbit, pivot, and/or otherwise move) while the milling cutter 120 is held stationary. In some other instances, the blank/workpiece spins (and may otherwise move) while the cutter 120 spins simultaneously (e.g., in an opposite direction). Though shown with four of the axes of motion on the milling cutter 120 side of the machine tool 100 set-up and one axis of motion on the workpiece mount side, the distribution of axes of motion can vary depending on the equipment, workpiece geometry and the product profile. Additional axes of motion may also apply. Further the cutter 120 and the workpiece can both have the capability of movement on the same axis of motion.

Figure 2:
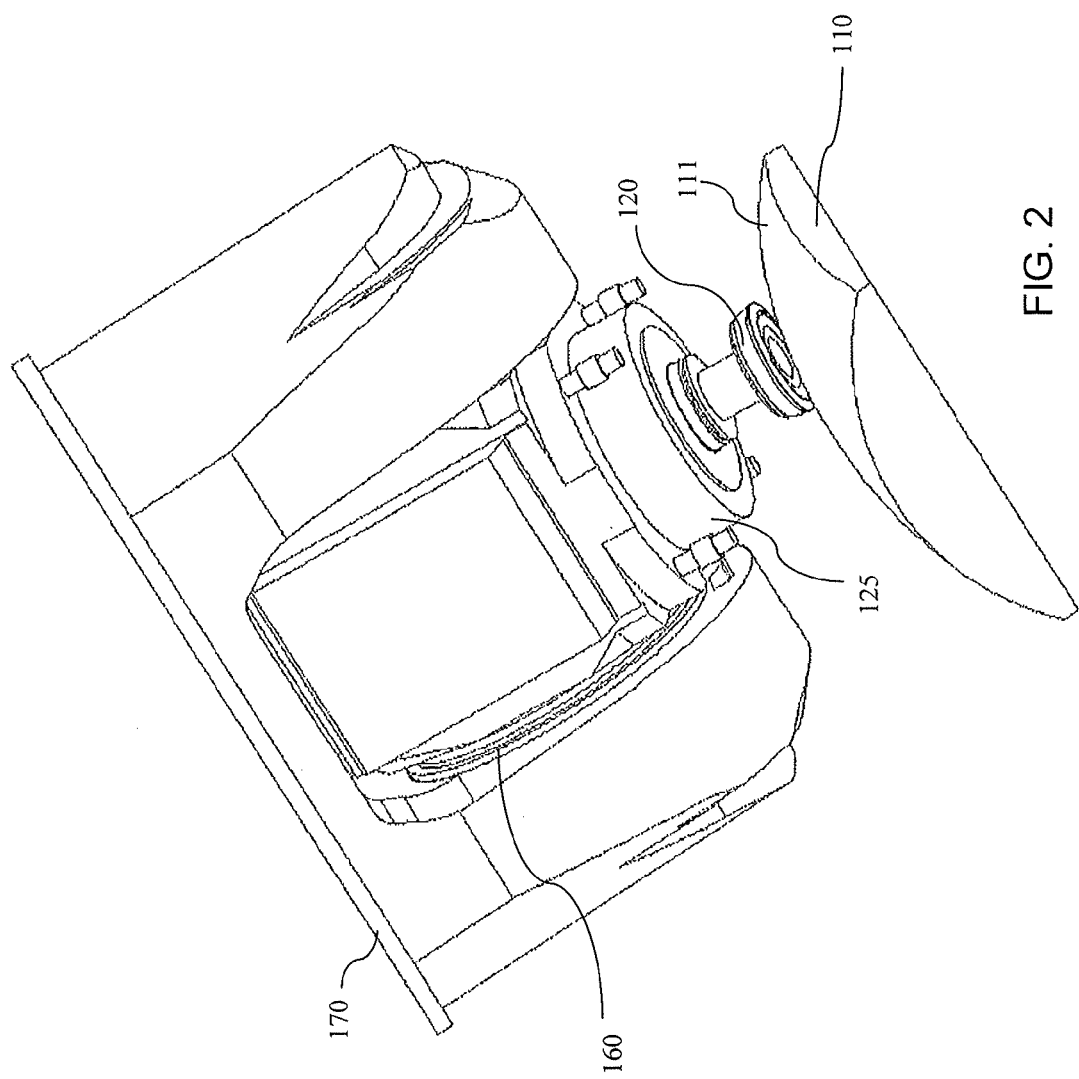
FIG. 2 depicts a perspective view of a representative arrangement of a workpiece and milling cutter of the conventional five-axis CNC machine tool of FIG. 1.

FIG. 2 shows the relative arrangement of a workpiece 110 and a milling cutter 120 and the direction of displacement thereof during the milling of the external profile of the workpiece. FIG. 2 depicts an example of an arrangement of a workpiece 110 and milling cutter 120 of the conventional five-axis CNC machine tool 100 of FIG. 1. The machine tool 100 has a A-axis actuator 160 and a C-axis actuator 170. The milling cutter 120 is attached to the machine tool 100 through a spindle 125 or equivalent mounting design and spins about its longitudinal axis.

Position of the milling cutter 120 in relation to the workpiece 110 contributes to the surface quality and productivity of the milling process. The positioning ability resulting from the combination of degrees of motion allows the cutter to follow curved or complex surfaces while maintaining surface quality and productivity. Though shown as a curved surface in FIG. 2, the geometry of the machined workpiece surface 111 can be a compilation of geometric designs and features. The machined workpiece surface 111 can include various geometric profiles. The workpiece surface 111 can also include a surface which has been subject to a machining process but still requires machining in reaching a final machined surface.

A CNC machine tool 100 operates a milling cutter 120 that is axially rotated while the blank workpiece 110 is advanced. The milling cutter 120 moves along the workpiece 110 in such a way that the blades of the cutter 120 are able to shave chips of material with each pass.

The milling cutter 120 removes an amount of material with each rotation. The amount of material removed is based on factors including cutter geometry, cutter rotational speed, and cutter advancement distance. Step-over is a parameter reflecting the portion of the diameter of the cutter 120 that is engaged in the cut during a pass of the milling cutter 120 along the workpiece 110. The amount of step-over can affect the surface roughness and productivity. A smaller step-over allows for a smoother surface improving surface finish. A larger step-over allows for the removal of more material per pass improving productivity. An embodiment of the present application provides an optimization of the conflicting parameters. The speed at which the cutter 120 advances along a workpiece 110 is the feed rate and is in relation to cutter geometry and cutter advancement distance. Feed rate can be expressed as a material advancement distance per full revolution of the cutter 120.

The rotation and the advancement of a milling cutter 120 create a non-continuous cutting operation. Surface cuts by a milling machine 100 will generally not be completely smooth. For some feed rates and step-over distances, the roughness can be microscopic but still contain regular ridges or scallops. Producing the microscopic roughness usually comes at the expense of productivity because of the longer machining time resulting from the slow feed rates and short step-over distances used. The parameters and occurrence of surface roughness can be calculated from the cutter geometry and the feed rate.

Figure 3B:
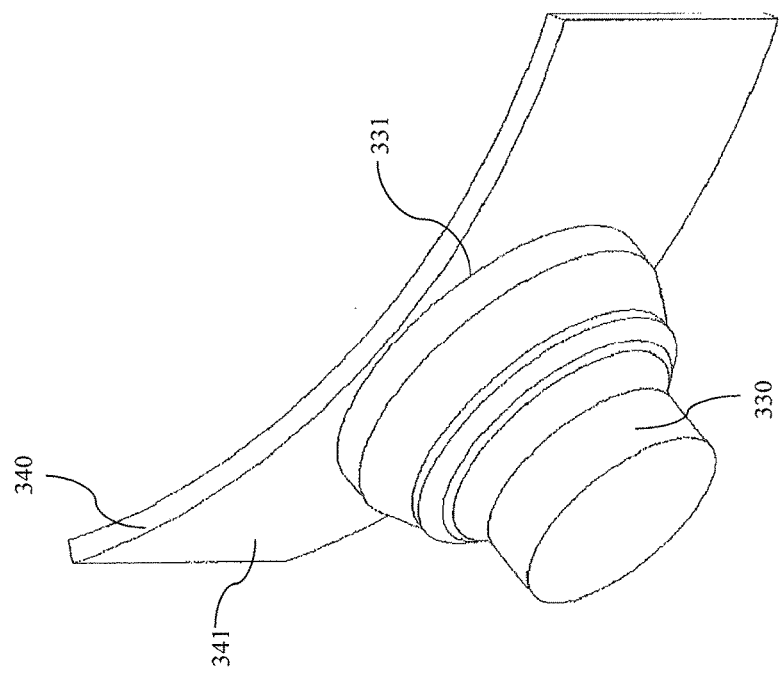
FIG. 3B depicts a perspective view of a face mill cutter machining a curvilinear surface.
Figure 3A:
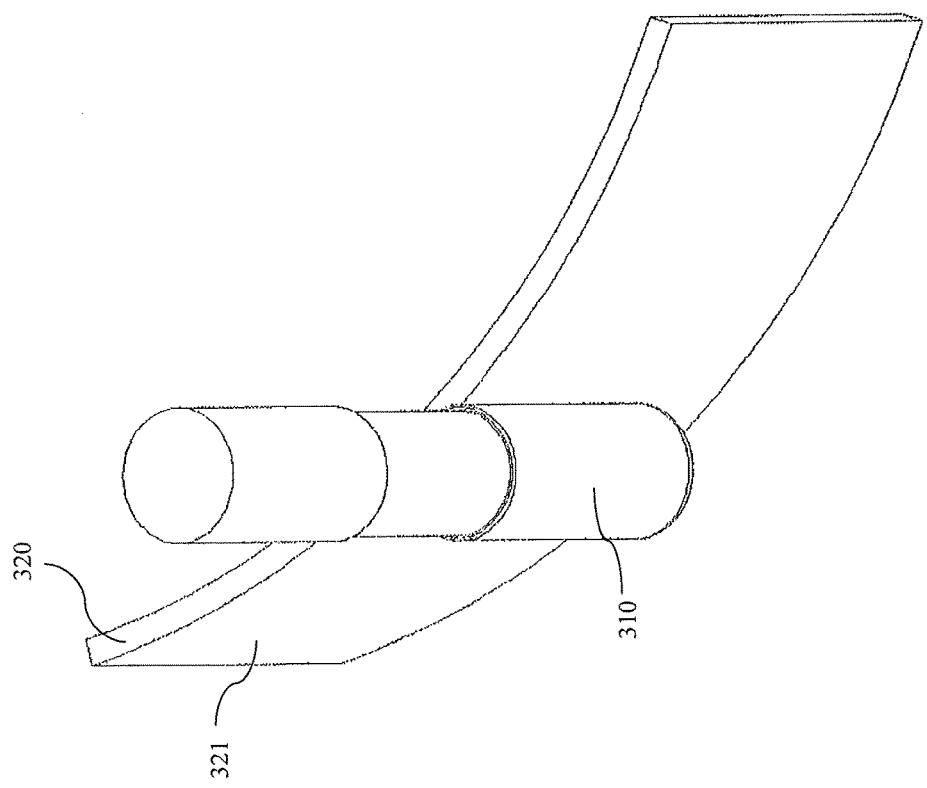
FIG. 3A depicts a perspective view of an end mill cutter machining a curvilinear surface.

FIGS. 3A and 3B depict two different ways to machine curvilinear surfaces. Milling a workpiece 320 having a contoured surface 321 with an end mill cutter 310 as shown in FIG. 3A has a low dynamic stiffness, which is more likely to result in chattering in machining. Once chattering occurs, it not only can reduce productivity, but it can also cause tool wear and can increase production cost. In addition, when contoured surfaces 321 are machined using ball end mills, a fine step-over distance and feed rate is required to obtain acceptable machined surface quality. This can consequently reduce the productivity. However, 4/5-axis face milling a workpiece 340 having a contoured surface 341 with a face mill cutter 330 as shown in FIG. 3B can provide a higher stiffness in the cutter-workpiece-machine system and can improve machining stability of the system, which may thereby ensure higher cutting performance parameters and improve the productivity of the machining method described herein, while obtaining a high quality of the surface being machined. Therefore, the total manufacturing time can be reduced using 4/5-axis face milling.

Embodiments of the method for machining complex surfaces of a workpiece by 4/5-axis milling described herein involve such relative displacements of the workpiece and the milling cutter and such relative positioning thereof that cutting forces developed during the machining at each profiled point of the surface should act substantially in the direction of maximum transverse stiffness of the workpiece.

Embodiments of the method described herein also exhibit high productivity with high surface finish by producing a high surface finish with an optimized step-over distance and feed rate.

Embodiments of the method described herein include a step or steps, wherein, during relative rotation of a workpiece and a milling cutter, a relative movement is imparted to the tooling system along the rotational axis of the workpiece, as well as a profile generation movement in the direction with respect to the rotational axis of the workpiece and to the direction of the profile generation. In addition, the milling cutter is positioned relative to the surface being machined in such a manner that the angle between the axis of the milling cutter and a line normal to each profiled point of the surface is substantially smaller than a right angle, whereby the workpiece profile is generated by the end face of the milling cutter. The above-described relative positioning of the workpiece and milling cutter and the relative displacements thereof contribute to positioning of the end face of the cutter closer to the contoured surface of a workpiece being machined. Thus, cutting forces act substantially in the direction of maximum transverse stiffness of workpieces.

Embodiments of the method described herein may result in a reduction of forces bending the workpiece, which may allow the step-over distance and feed rate to be increased, thereby improving productivity. At the same time, the above-mentioned positioning of the end face of a milling cutter closer to the contoured surface being machined may contribute to a smaller height of combs or scallop shaped roughness on the machined surface so that with a considerable step-over distance and feed rate the scallops remain within preset surface finish tolerances. Therefore, embodiments of the method described herein may result in both high productivity and a high quality of surface finish, simultaneously.

In embodiments of the method described herein, the relative positioning of the workpiece and milling cutter is preferably modified by turning each or both about an axis substantially normal to the rotational axes of the workpiece or milling cutter. Rotation of the workpiece and/or milling cutter can be independent or coordinated in time and/or space. Such turning action may permit a better positioning of the end face of the milling cutter and the surface being machined into a closer relationship, which may provide for an increased line width and thereby improving the productivity, while resulting in a high quality surface being machined.

Embodiments include a method for automatically selecting the optimal step-over and inclination angle of the cutter centerline or the work material to be machined on a computer numerically controlled (CNC) machine tool relative to an axis of rotation of the machine. The method may be embodied in a computer program to be executed by the CNC machine tool.

Figure 4:
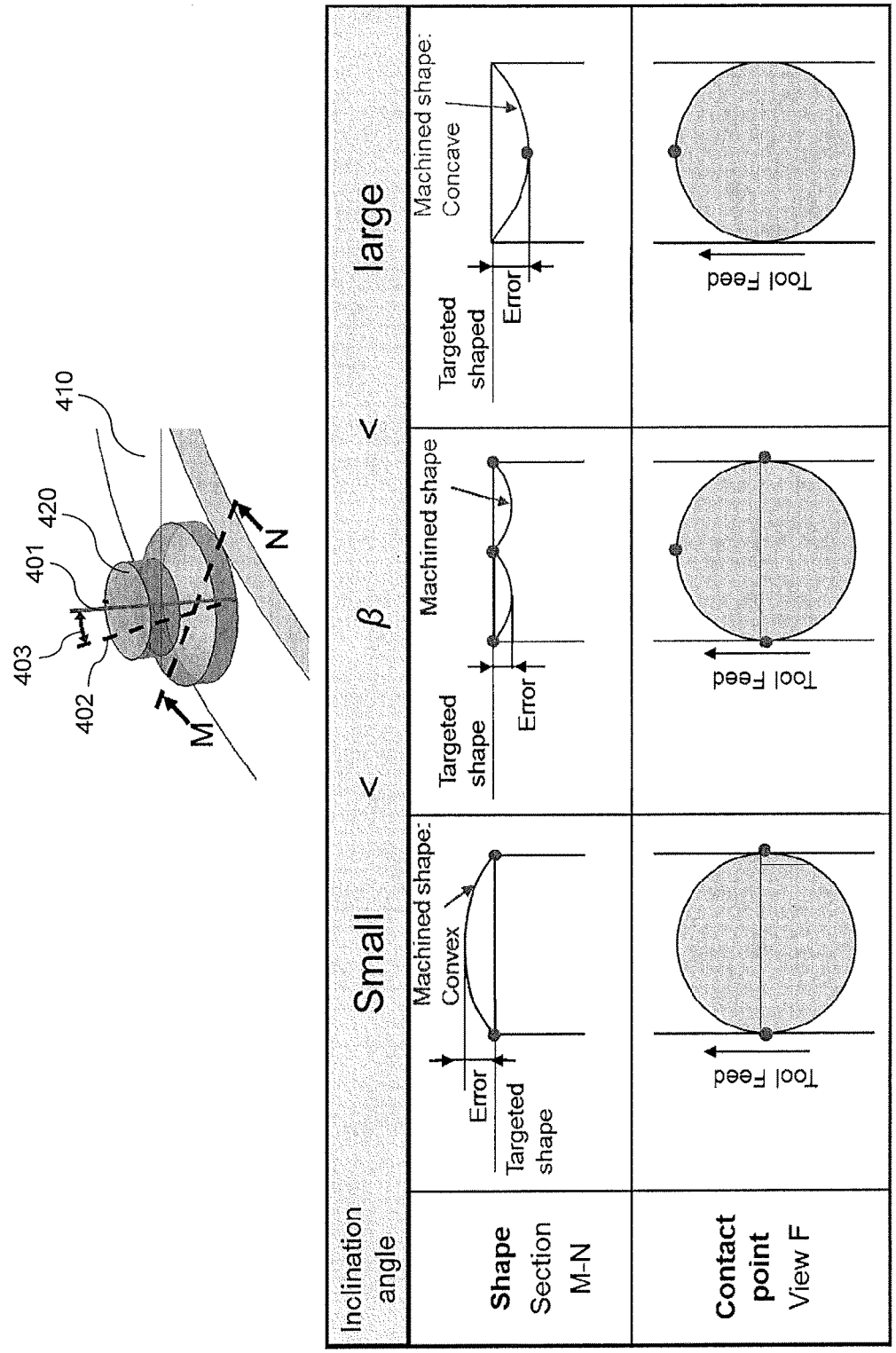
FIG. 4 is a chart depicting the effects of an inclination angle of the milling cutter on a machined surface.

In 4/5-axis face milling, the cutter orientation gives the process flexibility that three-axis milling does not. The cutter orientation is, in general, defined in the Local Coordinate System (LCS) by an inclination angle $\beta$ at its origin of the milling cutter longitudinal axis with respect to a surface normal during the advance of the milling cutter along the machining path at each machining point. In FIG. 4, Line 401 is shown along the longitudinal axis of the milling cutter 420. Line 401 is normal to a Line MN in the cutting surface face plane of the milling cutter 420. Line 402 is along a radius of a surface feature of the workpiece 410 intersecting the surface of the workpiece 410 at the machining point along the machining path. The angle of intersection between Line 401 and Line 402 provides an inclination angle 403 referred to as $\beta$.

Due to its advantages mentioned above, 4/5-axis milling is used in the machining of complex shaped surfaces in a wide range of industries. In 4/5-axis face milling, one can adjust inclination angle $\beta$ to adapt to a desired machining condition, e.g. to give high material removal and/or to avoid gouging for concave surfaces. Choosing an appropriate inclination angle $\beta$ can be difficult especially for complex parts with varying surface curvature. Inserted face mills such as the one shown in FIG. 3B have a cutting edge 331 on the cutter's effective outer-diameter. Therefore, when machining cylindrical geometries with a small inclination angle $\beta$ such as 0, the machined shape becomes convex as shown in the chart of FIG. 4 and the geometrical machining error along the milling cutter center line is large. On the other end of the chart in FIG. 4, when machining with a large inclination angle $\beta$, the machined shape becomes concave and geometrical machining error along the milling cutter center line is large. However, under a medium inclination angle $\beta$, three areas of machined surface are in contact with the cutting edge 331 as shown in FIG. 3, which generates a small scallop height. On the other hand, some regions in the concave surfaces may need a much larger minimum inclination angle $\beta$ compared to the others to avoid gouging. The trade-off for this is to have, in practice, a varying minimum (which is considered to be optimal) inclination angle $\beta$ along the cutter path, so that while machining, the cutter is dynamically adapted to be as close as possible to the surface without gouging. However, applying an inclination angle $\beta$ change over some distances influences the quality of machined surface. Embodiments of the method disclosed herein may be used to control such inclination angle $\beta$ variations in order to improve part accuracy.

Figure 5:
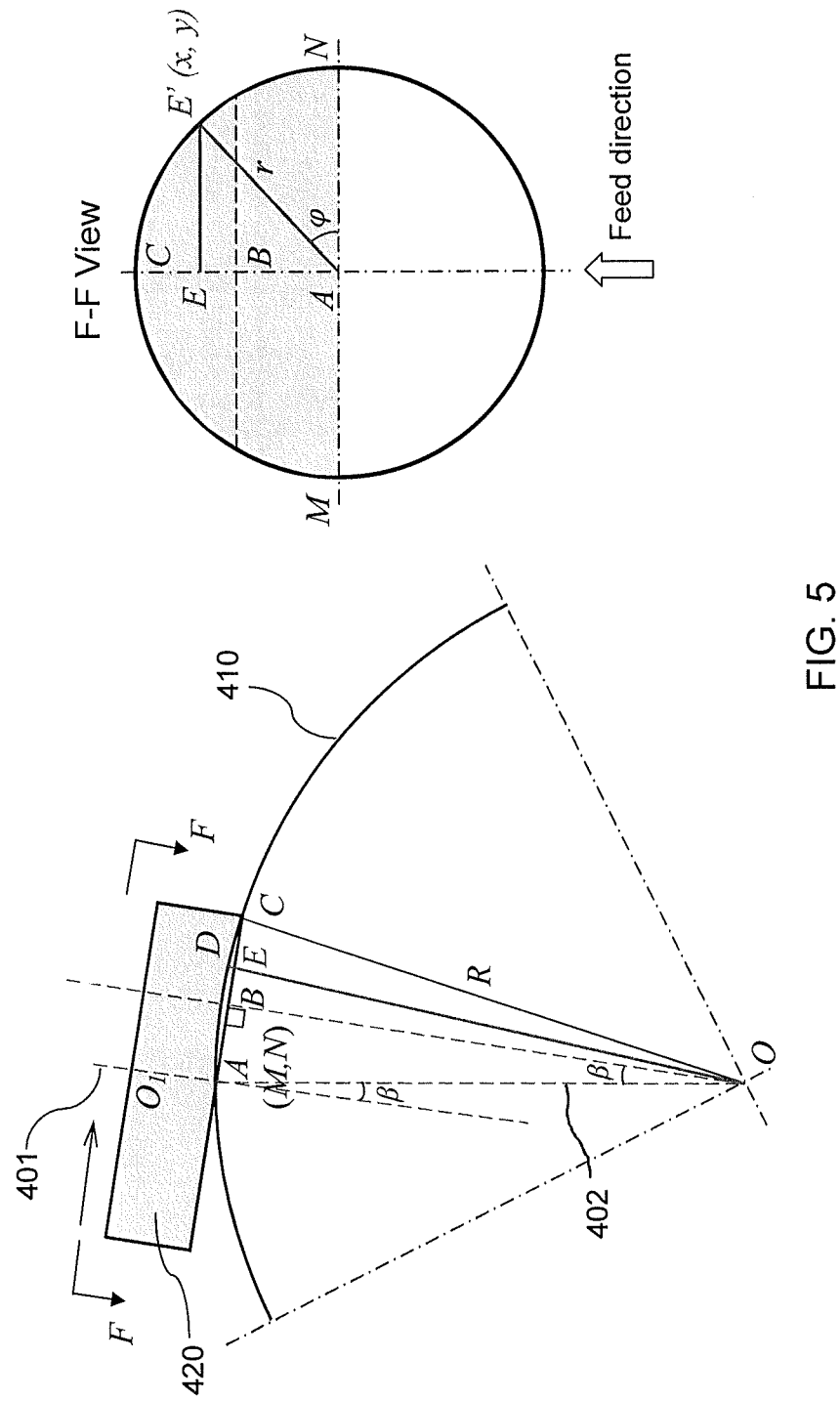
FIG. 5 is a diagram depicting a milling cutter inclination angle in 4/5-axis milling.

As shown in FIG. 5, for a point E' along the cutter path trajectory, its position is given as the following equation:

$$\begin{cases} x = r\cos\varphi \\ y = r\sin\varphi \end{cases} \qquad (1)$$

where r is the radius of the cutter diameter.

Accordingly, the distance between point E and the center of the curvilinear feature can be estimated as the following:

$$OE = \sqrt{\overline{BE}^2 + \overline{OB}^2} = \sqrt{(\overline{AE} - \overline{AB})^2 + \overline{OB}^2} \qquad (2)$$

where $\overline{AB}=R \sin \beta$, $\overline{OB}=R \cos \beta$, R is the radius of the surface feature of the workpiece profile, and $\beta$ is the inclination angle at any position (E) on the machined surface.

Therefore, in the local coordinate system, at the position of r cos $\varphi$, the geometrical machining error DE=$a_o$ can be calculated as:

$$\overline{DE} = a_o = R - OE = R - \sqrt{(\overline{AE} - \overline{AB})^2 + \overline{OB}^2}. \qquad (3)$$

Figure 6:
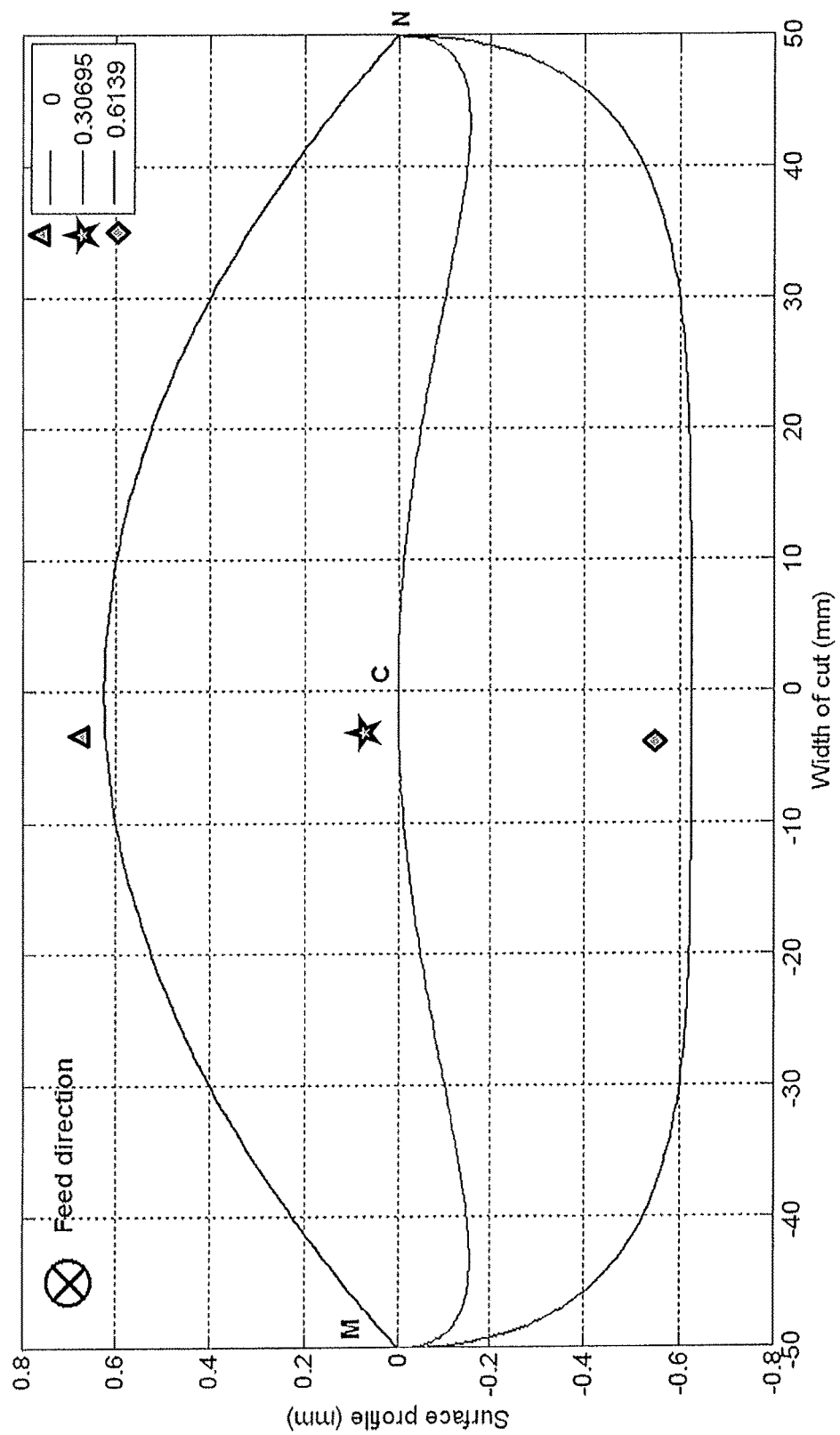
FIG. 6 is a chart depicting various machined surface profiles produced after a single pass of the milling cutter at corresponding inclination angles.

From Eq. (3), the machined surface profile can be estimated, which depends on three important parameters: radius of the feature, cutter diameter and inclination angle $\beta$. Based on Equations (1)-(3), the machined surface profile of the cross section along line MCN and the cutter center line under three different inclination angles $\beta$ can be estimated as shown in FIG. 6. The results depicted in FIG. 6 are based on an embodiment shown in FIG. 3 where the diameter of the face mill 330 is 100 mm and the radius of a feature of the workpiece surface 341 is 2000 mm. When the inclination angle $\beta$ is about 0, the maximum machining error is about 0.625 mm and when the inclination angle $\beta$ is set to a high value, such as about 2 times of the medium inclination angle $\beta$, the maximum machining error is about −0.625 mm. In comparison to these two cases, the maximum machining error under the medium inclination angle $\beta$ is relatively small. However the machined surface is still relatively rough after a single pass.

In practical applications, multi-pass 4/5-axis milling is needed for most parts. In a multi-pass 4/5 axis face milling process, the productivity increases as the step-over increases. However, a large step-over distance also affects the final machined surface quality. Unlike single-pass milling, in multi-pass milling the optimal inclination angle β depends not only on the radius of the feature and the cutter diameter but also on the size of the step-over. Thus it may be beneficial to select both the optimal cutter geometries and step-over value in order to achieve high material removal rate as well as the best possible surface finish.

Figure 7:
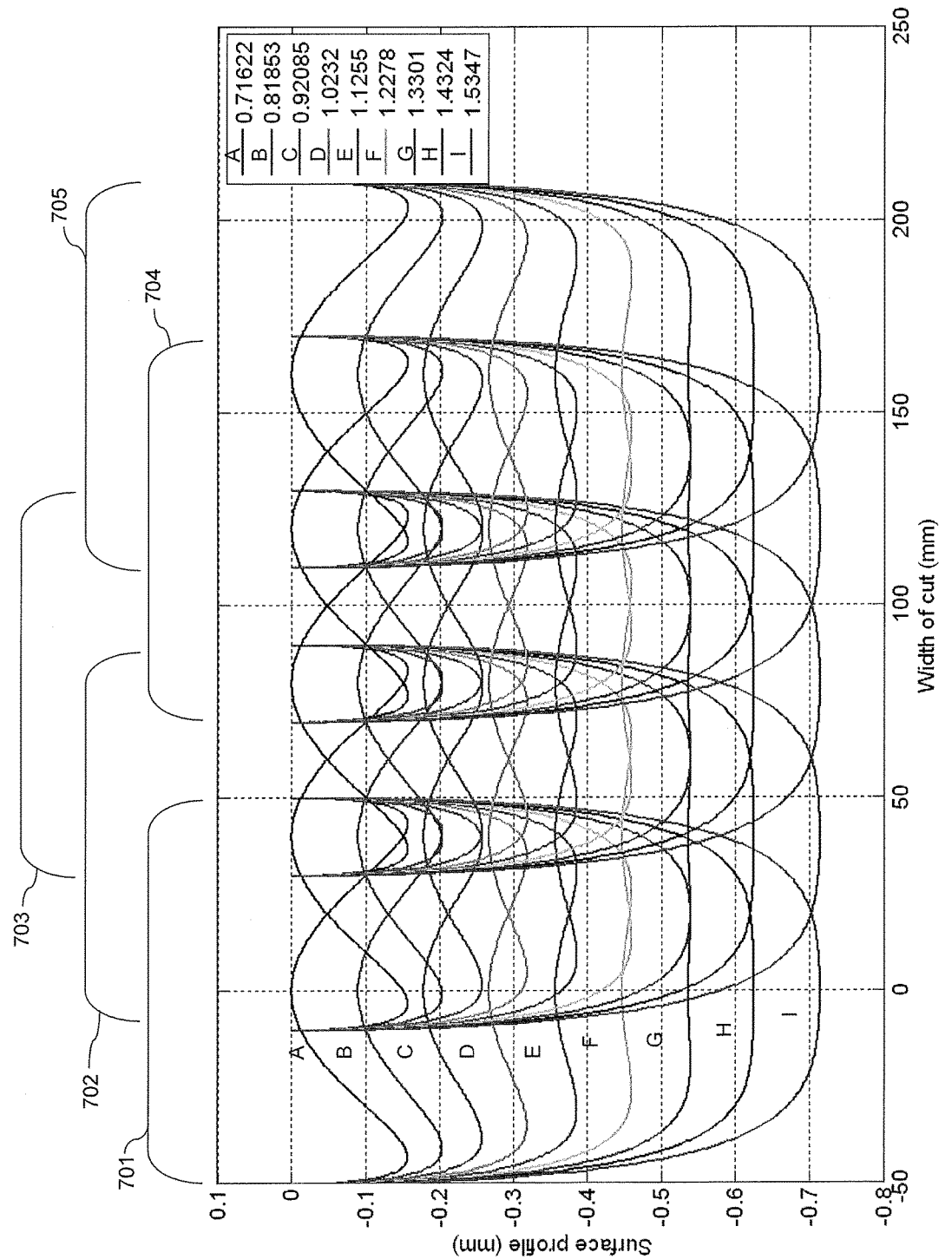
FIG. 7 is a chart depicting various machined surface profiles produced on each pass of a total of five passes with the milling cutter at corresponding inclination angles with a 40 mm step-over.
Figure 8:
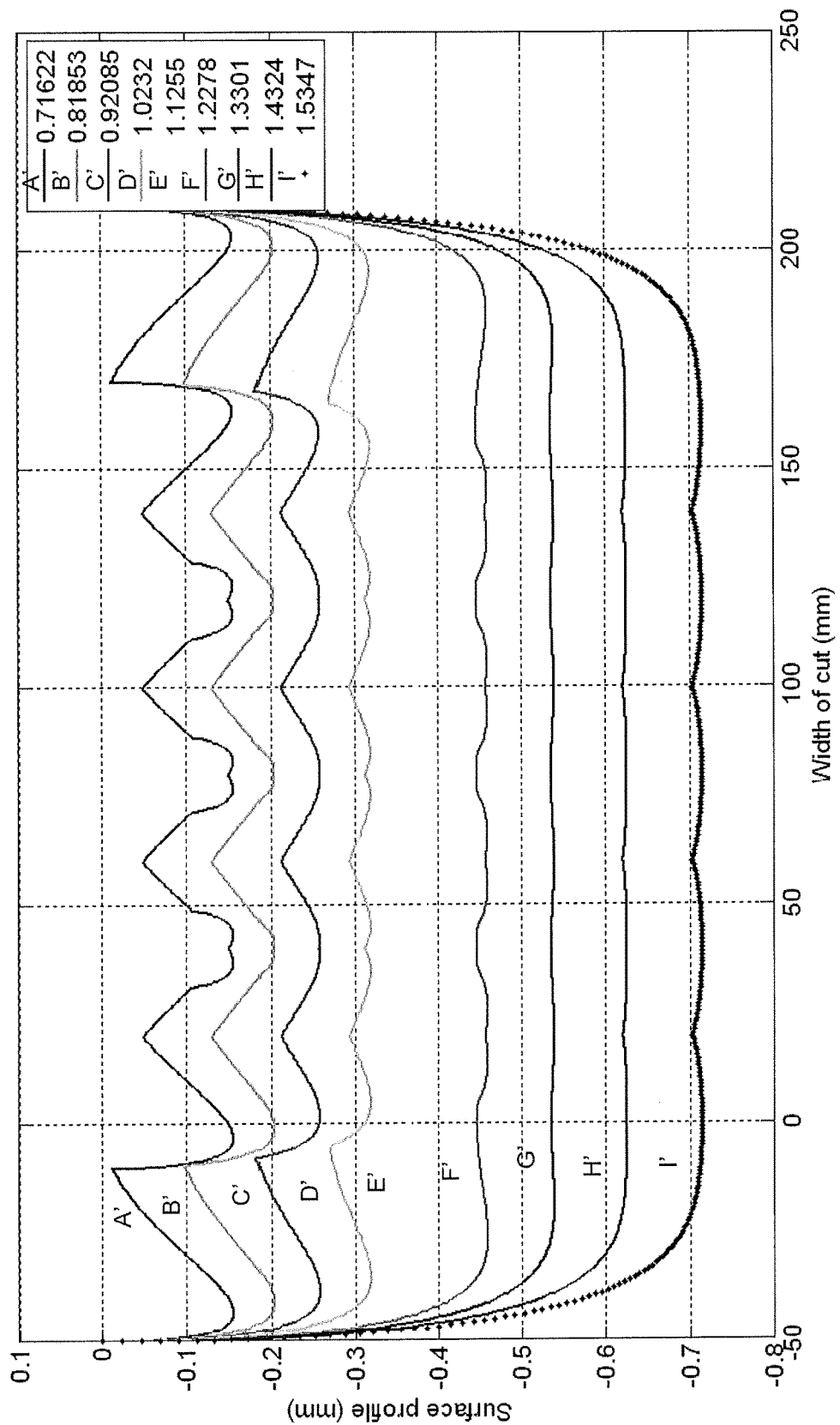
FIG. 8 is a chart depicting various final machined surface profiles produced by the process used to produce the data in FIG. 7.

Based on the geometrical information given, the surface profile after 5 passes at different inclination angles β is depicted in FIG. 7, for a cylindrical surface with a radius of 2000 mm using a face mill with a diameter of 100 mm and 40 mm step-over. As FIG. 6 showed the surface profile of a single pass for three inclination angles, FIG. 7 shows the surface profile of 5 passes for each run at nine different inclination angles (A-I). The surface profile of the first pass is shown in section 701. The surface profile of the second pass following a 40 mm step-over distance is shown in section 702. The surface profile of the third pass following the 40 mm step-over distance is shown in section 703. The surface profile of the fourth pass following the 40 mm step-over distance is shown in section 704. The surface profile of the fifth pass following the 40 mm step-over distance is shown in section 705. The areas above the profiles are the regions removed after machining. After removing those overlapped regions, the machined surface profiles (A'-I') at different inclination angles β are depicted in FIG. 8. Initially with the increase of the inclination angle β, the machined surface profile tends to become flat (see, e.g., progression from surface profile represented by line A' in FIG. 8 to surface profile represented by line G' in FIG. 8). However with the further increase of the inclination angle β, there is no more obvious improvement in terms of surface roughness (see, e.g., progression from surface profile represented by line G' in FIG. 8 to surface profile represented by line I' in FIG. 8).

Figure 9:
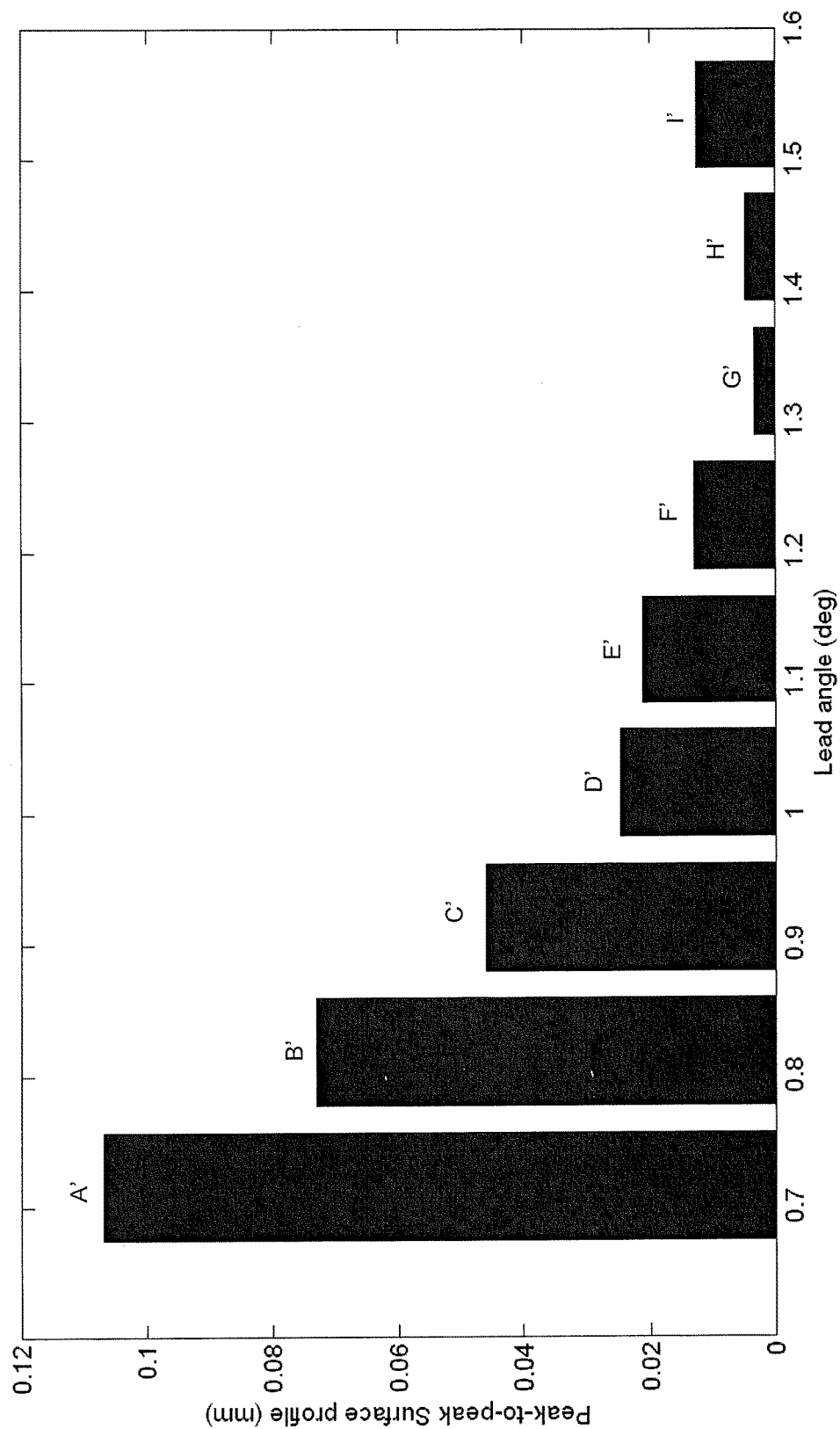
FIG. 9 is a chart depicting the peak-to-valley surface roughness produced by the process used to produce the data in FIGS. 7 and 8.

The peak-to-valley surface roughness for all these cases is depicted in FIG. 9. According to FIG. 9, initially the peak-to-valley surface roughness decreases as the inclination angle β increases and surface roughness reaches its minimum value at an inclination angle β of about 1.43 deg (from A' to G'). However, as the inclination angle β continues to increase, the peak-to-valley surface roughness starts to increase (from G' to I'). For this embodiment, the optimal inclination angle can be determined from G' of FIG. 8 and FIG. 9 as β=1.33.

Figure 10:
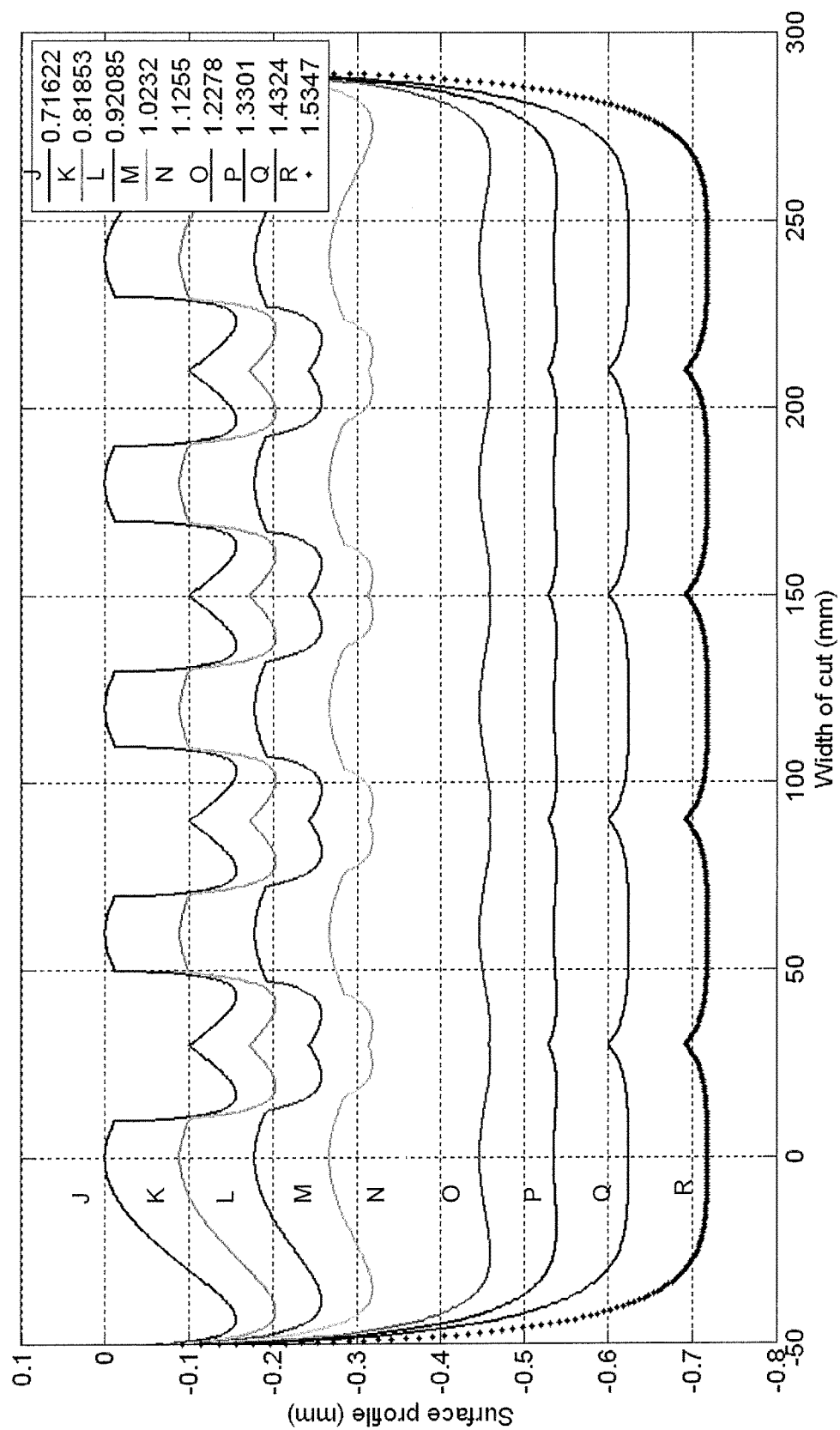
FIG. 10 is a chart depicting various final machined surface profiles produced by five passes with the milling cutter at corresponding inclination angles with a 60 mm step-over.
Figure 11:
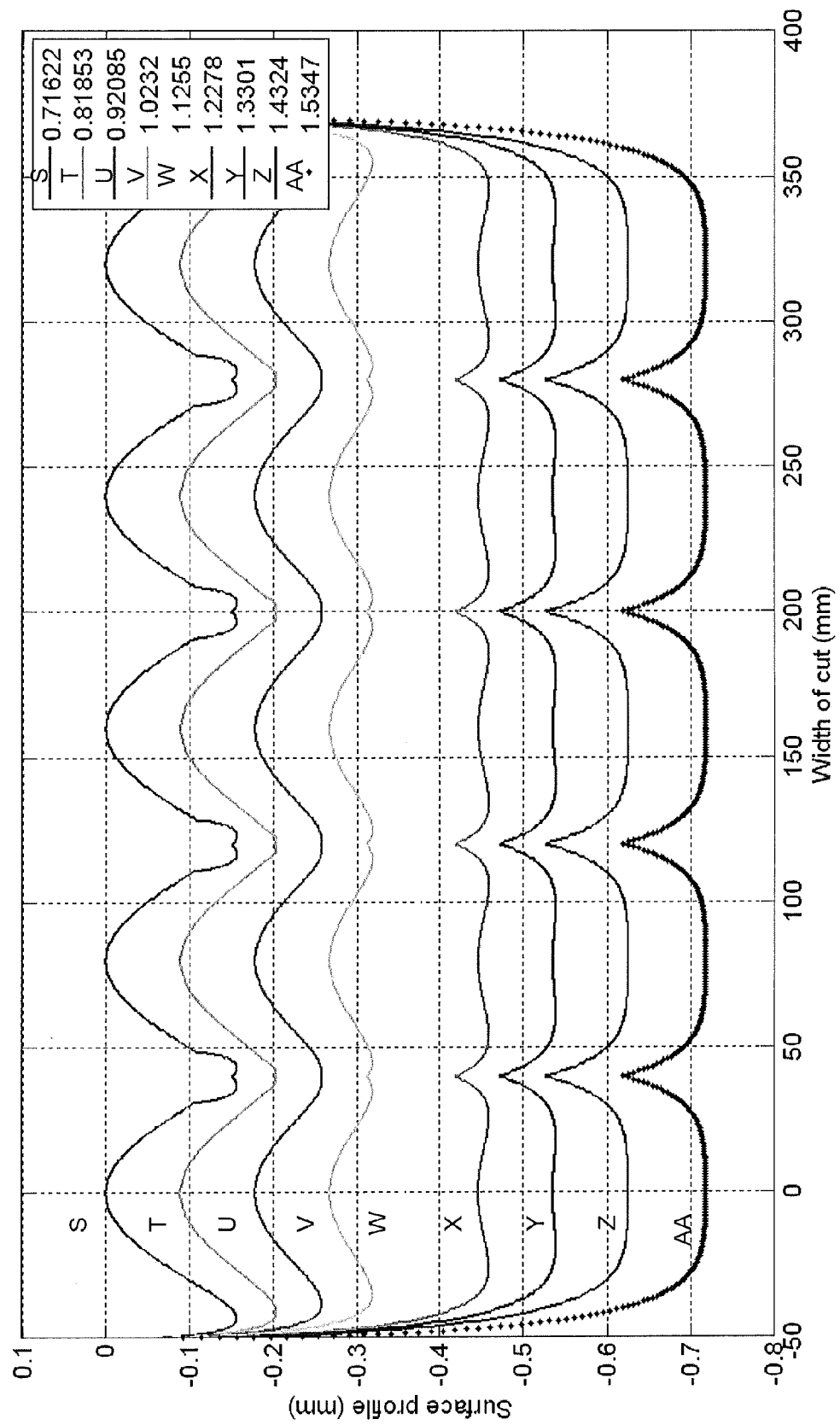
FIG. 11 is a chart depicting various final machined surface profiles produced by five passes with the milling cutter at corresponding inclination angles with an 80 mm step-over.

Meanwhile, consideration can be made for step-over distance where as the step-over increases, the total machining time can be reduced. However, as the step-over increases, the minimum surface roughness also increases and the optimal inclination angle β to achieve the minimum surface roughness is reduced. This effect is evident when one compares the surface profiles of FIG. 8, which were produced using a 40 mm step-over, to the surface profiles of FIG. 10, which were produced using a 60 mm step-over. Determined from FIG. 10 with 60 mm step-over, inclination angle β is optimized at O as β=1.2278. As depicted in FIG. 11, when the step-over is increased to 80 mm (S-AA), the machined surface profiles indicate scalloped shaped surface profiles, even under different inclination angles β. In other words, adjusting the inclination angle β will not result in a smooth machined surface when the step-over distance reaches a certain level. Thus, as noted above, there is a trade-off between the step-over distance (i.e. productivity) and surface roughness. Therefore, for given values of a feature radius and cutter diameter, there are optimal values of step-over distance and inclination angle β that will allow an operator to achieve high material removal rate and acceptable machined surface quality.

Figure 12:
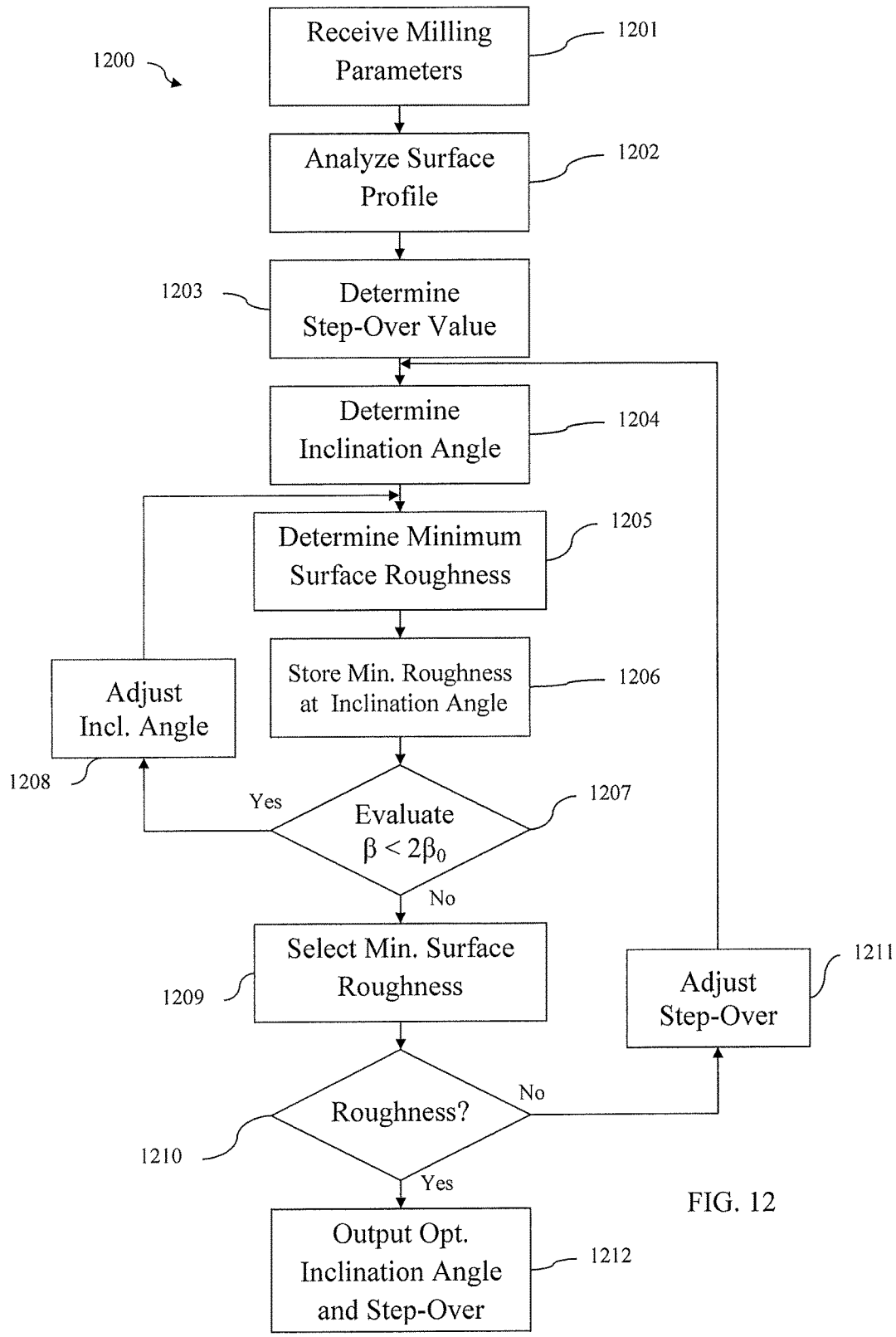
FIG. 12 is a flowchart depicting a method to determine optimal values for the inclination angle and step-over for machining a curvilinear surface with a face mill cutter.

The flow chart shown in FIG. 12 depicts a Method 1200 that may be employed to automatically select an optimal step-over value and an optimal inclination angle β to achieve both high productivity and high surface finish quality in a 4/5 axis face milling operation. Method 1200 may be part of a computer program executed by one or more processors or other hardware within a machine tool, such as a 4/5 axis CNC machine tool. In illustrated Method 1200, Procedures 1201, 1202, 1203 and 1204 gather and establish various initial parameters that are used in subsequent procedures to ultimately determine the optimal inclination angle β and step-over. Specifically, as shown, Procedure 1201 of Method 1200 comprises receiving the geometrical information of the cutter/tool, such as the shape and size of the cutter/tool. For instance, when the cutter comprises a face mill with a circular cutting edge, Procedure 1201 may include receiving the diameter of the circular cutting edge. The cutter geometry can be received from preprogrammed or pre-established parameters identified with the cutter. A CNC machine tool is capable of determining which cutter is being used and retrieving the cutter geometry through various methods such as but not limited to optical code scans, RFID chips, rack positions, etc. Procedure 1202 comprises analyzing the curvilinear surface of the workpiece before being machined and extracting radius information for different regions and creating the workpiece profile. In Procedure 1203 and Procedure 1204 of illustrated Method 1200 a step-over value and an inclination angle β are set, respectively. An initial step-over value of 100% of the diameter of the cutter/tool (e.g., the diameter of the circular cutting edge of a face mill) is established and the initial inclination angle, β, is set to 0 degrees for the first iteration.

Then, in Procedures 1205, 1206, 1207, 1208 and 1209, the initial parameters are plugged into the appropriate equations to determine the minimal surface roughness based on those parameters and evaluate if that is an acceptable minimal surface roughness. Specifically, in Procedure 1205, the machined surface profile and surface roughness are estimated using the parameters provided by Procedures 1201, 1202, 1203 and 1204 with Equations (1), (2), and (3) discussed above. Once the minimum surface roughness ($a_o$) is calculated, then in Procedure 1206 that value is stored in correlation with the inclination angle β. As noted above, the value for angle β is initially set at 0 in the first iteration. In Conditional 1207, the value for angle β that was just stored in Procedure 1206 can be evaluated according to the following equation: $\beta < 2\beta_0$, where $\beta_0 = a\tan(r/2R)$ where r is the milling cutter radius and R is the workpiece feature radius. If the value for β is less than $2\beta_0$ then the value for β is increased in Procedure 1208 and the calculations of Procedure 1205 are repeated with the new value for β. In the illustrated method, the value for β is increased to equal $\beta_0 + 0.2$. Alternatively, the value for β may be increased by any other suitable increment. Procedures 1205, 1206, 1207 may be repeated, increasing β by an additional 0.2 in each iteration, until the increased value for β is not less than $2\beta_0$. If the increased value for β is not less than $2\beta_0$, then Method 1200 proceeds to Procedure 1209, where the minimal surface roughness is set.

Once the minimal surface roughness is obtained, then that value is evaluated in Conditional 1210 to determine if it is acceptable or not (i.e. Conditional 1210 determines if the minimal surface roughness falls within preset surface roughness tolerances). If the minimal surface roughness is not an acceptable value, then in Procedure 1211 the step-over is adjusted and the calculations and evaluations in Procedures 1205-1210 are repeated using the new step-over. In one embodiment of Procedure 1211 of Method 1200, the step-over is reduced in 5% increments if the minimal surface roughness is not acceptable. Alternatively, the step-over may be reduced by any other suitable increments.

If the minimal surface roughness is acceptable, then the method reaches Procedure 1212, and the optimal inclination angle β from Procedure 1206 and step-over distance from Procedure 1203 or Procedure 1211 are output so that they can be used by the machine tool to control and index the cutter/tool and/or the workpiece. Use of the optimal inclination angle β and step-over may allow the milling cutter to produce a product with a high machined surface quality at a high rate of productivity.

Figure 13:
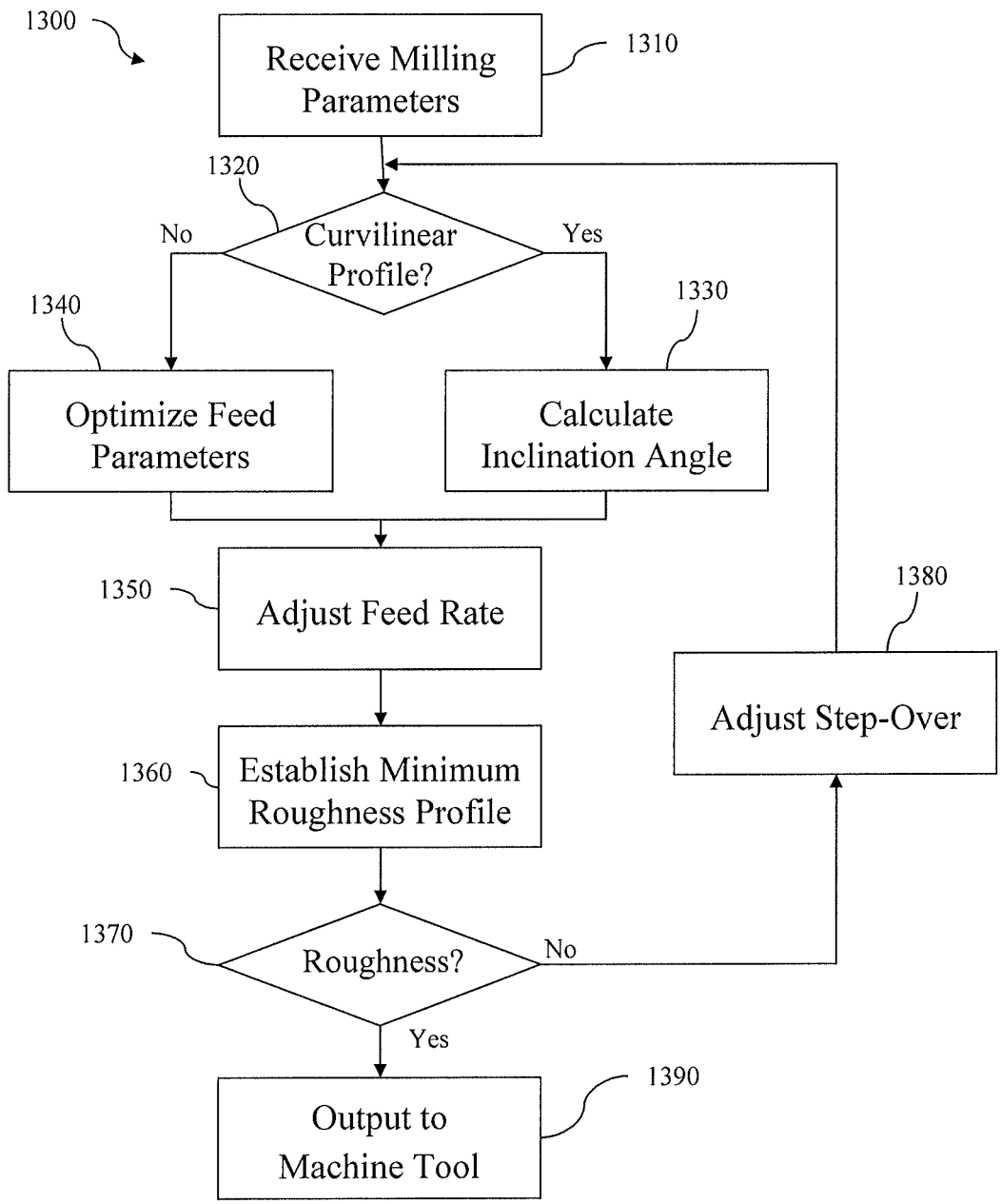
FIG. 13 is a flowchart depicting another method to determine optimal values for the inclination angle and step-over for machining a curvilinear surface with a face mill cutter.

In FIG. 13, a Milling Process 1300 is shown for multi-pass 4/5-axis milling to select optimal tooling geometry and step-over values. As noted above, there is a tradeoff between the step-over distance (i.e. productivity) and surface roughness (i.e. component quality). For given values of a surface feature radius and a milling cutter diameter, there are optimal values for step-over and inclination angle β to achieve high material removal rate and high machined surface quality. Procedure 1310 of Milling Process 1300 retrieves milling parameters. Milling parameters can include, but are not limited to, machine parameters, such as range of motion along each axis, rotational motion, translational motion range, and the number of degrees of motion; cutter parameters such as type, diameter, step-over distance, and rotational and translational cutter speed; and workpiece parameters such as size, regions of surface features, and radius values at points on the surface, for example.

Procedure 1320 evaluates a profile of a machining surface of a workpiece. Evaluation of the machining surface includes determining surface features at points on the surface and identifying contoured features along with the feature geometry, such as but not limited to, surface area and radius. For one embodiment, contoured features can be determined by comparing a change in radius of the surface feature. If the portion of the machining surface being evaluated does not include a contoured or curvilinear profile, Process 1300 continues with Procedure 1340 which optimizes machining parameters for non-curvilinear profiles including feed rate and step-over distance. For a workpiece having a contoured profile, Milling Process 1300 continues with Procedure 1330 to calculate an inclination angle β from the origin of a feature of the curvilinear profile and the cutter's longitudinal axis with respect to the surface during the advance of the cutter along the machining path on the workpiece surface. As the cutter advances along the machining surface and the properties of the curvilinear profile change, the calculated inclination angle also changes creating a dynamic inclination angle value.

Inclination angle β can be adjusted for varying machining conditions to address productivity (high material removal rates) and surface quality (avoid gouging). To accommodate the varying machining conditions, a varying minimum inclination angle β can be determined along a cutter path. The cutter can be dynamically adapted to follow the surface of the workpiece without gouging.

After determination of the inclination angle β, Milling Process 1300 applies the inclination angle β and the milling parameters to a feed rate command curve in Procedure 1350. The feed rate would incorporate the dynamic inclination angle value as the cutter translates along the machining surface of the workpiece. Feed rate is an indication of productivity expressing the speed at which the cutter moves along the machining surface.

From the milling parameters, the inclination angle β, the feed rate command curve and the machining surface, a minimum surface roughness profile is estimated in Procedure 1360. Minimum surface roughness can be calculated using milling parameters, machining surface features, and the inclination angle β to determine an axial depth of a cut from the following equations:

$$\begin{cases} x = r\cos\varphi \\ y = r\sin\varphi \end{cases}, \quad (1)$$

$$OE = \sqrt{\overline{BE}^2 + \overline{OB}^2} = \sqrt{(\overline{AE} - \overline{AB})^2 + \overline{OB}^2}, \text{ and} \quad (2)$$

$$\overline{DE} = a_o = R - OE = R - \sqrt{(\overline{AE} - \overline{AB})^2 + \overline{OB}^2} \quad (3)$$

where $\overline{AB} = R \sin \beta$ and $\overline{OB} = R \cos \beta$, and where r is a cutter radius, R is a surface feature radius and β is an inclination angle.

The minimum surface roughness profile is evaluated in Procedure 1370. For surface roughness values outside a quality control range, Milling Process 1300 can include a Procedure 1380 where a step-over value is adjusted to optimize surface roughness and productivity. Milling Process 1300 can return to Procedure 1320 to evaluate the machining surface profile following Procedure 1380. For minimum surface roughness profiles within a quality control range, the parameters including the dynamic inclination angle value, the step-over value, and the curvilinear profile of the machining surface are applied to the machine tool controls. In one embodiment, Milling Process 1300 can be a continuous process to improve minimum surface roughness. In another embodiment, Milling Process 1300 can be a continuous process as the milling cutter travels along the machining surface of the workpiece.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

What is claimed is:

1. A method for performing a milling operation, the method comprising:
   providing a milling cutter and a workpiece having a non-machined workpiece surface;
   receiving, at a computer, a set of milling cutter geometry parameters;
   creating, at the computer, a curvilinear profile from the workpiece surface;
   extracting, at the computer, a radius parameter from the curvilinear profile;
   determining, at the computer, an initial step-over value in response to the set of milling cutter geometry parameters;

determining, at the computer, a surface roughness value in response to the set of milling cutter geometry parameters, the curvilinear profile of the workpiece surface, the radius parameter, and an initial value of a cutter inclination angle;

determining, at the computer, a minimum surface roughness value in response to the cutter inclination angle value;

adjusting, at the computer, the cutter inclination angle value in response to the minimum surface roughness value;

adjusting, at the computer, a calculated step-over value in response to the minimum surface roughness value; and positioning the milling cutter traveling along the workpiece using the calculated step-over value and the adjusted cutter inclination angle value.

2. The method of claim 1, wherein determining the surface roughness value further includes determining a surface position in response to the set of milling cutter geometry parameters, the curvilinear profile of the workpiece surface, and the radius parameter according to:

$$\begin{cases} x = r\cos\varphi \\ y = r\sin\varphi \end{cases}$$

wherein the set of milling cutter geometry parameters includes r as a radius and $\varphi$ as a cutter angular position.

3. The method of claim 2, wherein determining the surface roughness value further includes determining a value, OE, in response to the set of milling cutter geometry parameters, the curvilinear profile of the workpiece surface, and the radius parameter according to:

$$OE=\sqrt{BE^2+OB^2}$$

wherein
OB=R cos $\beta$ and
BE is determined according to:

$$BE=AE-AB$$

wherein
AE=y
AB=R sin $\beta$
R is the radius parameter and
$\beta$ is the adjusted cutter inclination angle value.

4. The method of claim 1, wherein determining the surface roughness value further includes determining a machining error value, DE, in response to the set of milling cutter geometry parameters, the curvilinear profile of the workpiece surface, and the radius parameter according to:

$$DE=R-OE$$

wherein
R is the radius parameter and
OE is determined according to:

$$OE=\sqrt{(AE-AB)^2+OB^2}$$

wherein
AB=R sin $\beta$
OB=R cos $\beta$
$\beta$ is the adjusted cutter inclination angle value and
AE=r sin $\varphi$
wherein the set of milling cutter geometry parameters includes r as a radius and $\varphi$ as a cutter angular position, and wherein the machining error value indicates a calculated surface roughness.

5. The method of claim 1, further including:
evaluating the adjusted cutter inclination angle value according to:

$\beta<2\beta_0$, where $\beta_0=a\tan(r/2R)$, wherein the set of milling cutter geometry parameters includes r as a radius and the curvilinear profile of the workpiece surface includes R as a radius, and wherein an adjusted surface roughness is determined with the adjusted cutter inclination angle value when the calculated inclination angle value is less than $2\beta_0$.

6. The method of claim 1, further including establishing the initial step-over value as 100-percent of a selected one of the milling cutter geometry parameters.

7. The method of claim 6, wherein the selected one of the milling cutter geometry parameters is a diameter of a portion of the milling cutter.

8. The method of claim 1, further including establishing the initial value of the cutter inclination angle as zero degrees.

9. The method of claim 1, wherein the milling cutter is a face mill cutter.

10. The method of claim 1, comprising repeating at least once the steps of determining a minimum surface roughness value, adjusting the cutter inclination angle value and adjusting a calculated step-over value prior to executing the step of positioning the milling cutter.

11. A method of performing a milling operation, the method comprising:
positioning a contoured workpiece;
positioning a milling tool in relation to the contoured workpiece;
creating a machining surface profile of the contoured workpiece;
determining a dynamic inclination angle value in response to the machining surface profile of the contoured workpiece and a set of parameters of the milling tool;
determining a minimum surface roughness profile in response to the dynamic inclination angle value, the machining surface profile of the contoured workpiece, and a set of parameters of the milling tool; and
repositioning the milling tool traveling along the contoured workpiece in response to the minimum surface roughness profile and a condition of the dynamic inclination angle value.

12. The method of claim 11, wherein the condition of the dynamic inclination angle value is less than 90-degrees.

13. The method of claim 11, wherein determining the minimum surface roughness profile further includes determining a surface position in response to the set of parameters of the milling tool, the machining surface profile of the contoured workpiece, and a radius parameter of the contoured workpiece according to:

$$\begin{cases} x = r\cos\varphi \\ y = r\sin\varphi \end{cases}$$

wherein the set of parameters of the milling tool includes r as a radius and $\varphi$ as a cutter angular position.

14. The method of claim 13, wherein determining the minimum surface roughness profile further includes determining a value, OE, in response to the set of milling tool parameters, the machining surface profile of the contoured workpiece, and the radius parameter of the contoured workpiece according to:

$$OE=\sqrt{BE^2+OB^2}$$

wherein
OB=R cos β and
BE is determined according to:

$$BE=AE-AB$$

wherein
AE=y
AB=R sin β
R is the radius parameter and
β is the dynamic inclination angle value.

15. The method of claim 14, wherein determining the minimum surface roughness profile further includes determining a machining error value, DE, in response to the set of milling tool parameters, the machining surface profile of the contoured workpiece, and the radius parameter of the contoured workpiece according to:

$$DE=R-OE$$

wherein the machining error value indicates a calculated surface roughness.

16. The method of claim 11, wherein positioning the milling tool further includes rotating the milling tool about an axis normal to a longitudinal axis of the milling tool in response to the dynamic inclination angle value.

17. The method of claim 11, wherein positioning the workpiece further includes rotating the contoured workpiece about an axis normal to a rotational axis of the tool in response to the dynamic inclination angle value.

18. A method for multi-pass 4/5-axis milling comprising:
receiving, at a computer, a set of cutter parameters for a milling cutter;
evaluating, at the computer, a curvilinear profile of a machining surface;
calculating, at the computer, an inclination angle value in response to the curvilinear profile when a first response is received in the evaluating the curvilinear profile step;
producing, at the computer, a feed rate command curve;
estimating a machined surface profile and a peak-to-valley surface roughness value by:
determining, at the computer, a surface position in response to the set of cutter parameters, the curvilinear profile of the machining surface, and a radius parameter of the machining surface according to:

$$\begin{cases} x = r\cos\varphi \\ y = r\sin\varphi \end{cases}$$

wherein the set of cutter parameters includes r as a radius and φ as a cutter angular position,
determining, at the computer, a value, OE, in response to the set of cutter parameters, the curvilinear profile of the machining surface, and the radius parameter of the machining surface according to:

$$OE=\sqrt{BE^2+OB^2}$$

wherein
OB=R cos β and
BE is determined according to:

$$BE=AE-AB$$

wherein
AE=y
AB=R sin β
R is the radius parameter and
β is the calculated inclination angle value
determining, at the computer, a machining error value, DE, in response to the set of cutter parameters, the curvilinear profile of the machining surface, and the radius parameter of the machining surface according to:

$$DE=R-OE$$

wherein the machining error value indicates a calculated surface roughness;
evaluating, at the computer, the calculated surface roughness;
adjusting, at the computer, a step-over value in response to the calculated surface roughness; and
positioning the milling cutter traveling along the machining surface using the adjusted step-over value and the calculated inclination angle value.

19. The method of claim 18, wherein evaluating the curvilinear profile of the machining surface further includes determining an optimal feed value and an optimal feed rate for the milling cutter when a second response is received in evaluating the curvilinear profile.

20. The method of claim 18, wherein evaluating the calculated surface roughness further includes reducing a step-over value when a third response is received in the evaluating the calculated surface roughness.

21. The method of claim 20, wherein adjusting the step-over value further includes returning to evaluating the curvilinear profile of the machining surface.

22. A machining system comprising:
a. a machine tool comprising a milling cutter, the machine tool operable to move the milling cutter to travel along a workpiece surface of a workpiece, and
b. a computer configured to:
i. receive a set of milling cutter geometry parameters;
ii. create a curvilinear profile from the workpiece surface;
iii. determine an initial step-over value in response to the set of milling cutter geometry parameters;
iv. determine a surface roughness value in response to the set of milling cutter geometry parameters, the curvilinear profile of the workpiece surface, the radius parameter, and an initial value of a tool cutter inclination angle;
v. determine a minimum surface roughness value in response to the cutter inclination angle value;
vi. adjust the cutter inclination angle value in response to the minimum surface roughness value;
vii. adjust a calculated step-over value in response to the minimum surface roughness value; and
viii. instruct the machine tool to position the milling cutter along the workpiece in response to the calculated step-over value and the adjusted cutter inclination angle value.

23. The machine system of claim 22, wherein the computer is configured to establish the initial step-over value as 100-percent of a selected one of the milling cutter geometry parameters.

24. The machine system of claim 23, wherein the selected one of the milling cutter geometry parameters is a diameter of a portion of the milling cutter.

25. The machine system of claim 22, wherein the computer is configured to establish the initial value of the cutter inclination angle as zero degrees.

26. The machine system of claim 22, wherein the milling cutter is a face mill cutter.

27. The machine system of claim 22, wherein the computer being configured to determine the surface roughness value further includes the computer configured to determine a surface position in response to the set of milling cutter geometry parameters, the curvilinear profile of the workpiece surface, and the radius parameter according to:

$$\begin{cases} x = r\cos\varphi \\ y = r\sin\varphi \end{cases}$$

wherein the set of milling cutter geometry parameters includes r as a radius and $\varphi$ as a cutter angular position.

28. The machine system of claim 27, wherein the computer being configured to determine the surface roughness value further includes the computer configured to determine a value, OE, in response to the set of milling cutter geometry parameters, the curvilinear profile of the workpiece surface, and the radius parameter according to:

$$OE=\sqrt{BE^2+OB^2}$$

wherein
OB=R cos $\beta$ and
BE is determined according to:

$$BE=AE-AB$$

wherein
AE=y
AB=R sin $\beta$
R is the radius parameter and
$\beta$ is the adjusted cutter inclination angle value.

29. The machine system of claim 22, wherein the computer being configured to determine the surface roughness value further includes the computer configured to determine a machining error value, DE, in response to the set of milling cutter geometry parameters, the curvilinear profile of the workpiece surface, and the radius parameter according to:

$$DE=R-OE$$

wherein
R is the radius parameter and
OE is determined according to:

$$OE=\sqrt{(AE-AB)^2+OB^2}$$

wherein
AB=R sin $\beta$
OB=R cos $\beta$
$\beta$ is the adjusted cutter inclination angle value and
AE=r sin $\varphi$
wherein the set of milling cutter geometry parameters includes r as a radius and $\varphi$ as a cutter angular position, and
wherein the machining error value indicates a calculated surface roughness.

30. The machine system of claim 22, wherein the computer is configured to evaluate the adjusted cutter inclination angle value according to:

$$\beta < 2\beta_0, \text{ where } \beta_0 = a\,\tan(r/2R),$$

wherein the set of milling cutter geometry parameters includes r as a radius and the curvilinear profile of the workpiece surface includes R as a radius, and
wherein an adjusted surface roughness is determined with the adjusted cutter inclination angle value when the calculated inclination angle value is less than $2\beta_0$.

* * * * *